United States Patent
Fu et al.

(10) Patent No.: US 7,379,498 B2
(45) Date of Patent: May 27, 2008

(54) RECONSTRUCTING A COMPRESSED STILL IMAGE BY TRANSFORMATION TO A COMPRESSED MOVING PICTURE IMAGE

(75) Inventors: Jiang Fu, Irvine, CA (US); Jeff Fisher, Dublin, CA (US); Sherman (Xuemin) Chen, San Diego, CA (US); Yasantha Rajakarunanayake, San Ramon, CA (US); Marcus Kellerman, Aliso Viejo, CA (US); Vladimir Silyaev, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 460 days.

(21) Appl. No.: 10/095,258

(22) Filed: Mar. 11, 2002

(65) Prior Publication Data

US 2003/0169814 A1     Sep. 11, 2003

(51) Int. Cl.
H04N 7/12 (2006.01)
H04B 1/66 (2006.01)

(52) U.S. Cl. .................................. 375/240.12
(58) Field of Classification Search ................
375/240.12–240.16, 240.18, 240.2, 240.24;
382/232, 236; 386/111; 709/204; 348/232;
455/435; H04N 7/12
See application file for complete search history.

(56) References Cited

U.S. PATENT DOCUMENTS

| | | | | |
|---|---|---|---|---|
| 5,666,115 A | * | 9/1997 | Colavin | 341/67 |
| 5,999,111 A | * | 12/1999 | Park et al. | 341/67 |
| 6,141,447 A | * | 10/2000 | Linzer et al. | 382/236 |
| 6,507,592 B1 | * | 1/2003 | Hurvig et al. | 370/503 |
| 6,577,767 B2 | * | 6/2003 | Lee | 382/236 |
| 2002/0027603 A1 | * | 3/2002 | Kuwata et al. | 348/232 |
| 2002/0080877 A1 | * | 6/2002 | Lu et al. | 375/240.24 |
| 2002/0126752 A1 | * | 9/2002 | Kim | 375/240.2 |
| 2002/0133546 A1 | * | 9/2002 | Liang et al. | 709/204 |
| 2003/0050062 A1 | * | 3/2003 | Chen et al. | 455/435 |
| 2003/0123857 A1 | * | 7/2003 | Egawa et al. | 386/111 |

FOREIGN PATENT DOCUMENTS

WO     WO 00 51357 A     8/2000

OTHER PUBLICATIONS

"Digital Still Camera Image File Format Standard", Japan Electronic Industry Development Association, Version 2.1 Jun. 12, 1998.
ISO/IEC 13818-2 MPEG-2 Video (ITU-R H.262), 1995.
CCITT T.81 (Sep. 1992), *Terminal Equipment And Protocols For Telematic Services*.

(Continued)

*Primary Examiner*—Nhon Diep
(74) *Attorney, Agent, or Firm*—McAndrews, Held & Malloy, Ltd.

(57) ABSTRACT

A transcoder (10) and a decoder (80) reconstruct an image from still image compressed data, such as EXIF data. The transcoder transcodes the still image compressed data into a bit stream of moving picture compressed data, such as an MPEG-2 4:2:2P bit stream with only intra pictures. The decoder (80) decodes the bit stream of moving picture compressed data into a still picture image that can be stored in a digital memory (100).

20 Claims, 6 Drawing Sheets

OTHER PUBLICATIONS

P.A. Sarginson, *MPEG-2: Overview Of The Systems Layer*, BBC RD Feb. 1996.

P. W. Wong, *Still Image Compression And Halftoning*, CRC Press, Inc. (1997) 1437-1447.

S. Solari, *Digital Video And Audio Compression*, McGraw-Hill, Chapter Five, 116-140.

*Video Compression Standards*, Chapter 9, 213-232.

E. Hamilton, *JPEG File Interchange Format*, Sep. 1, 1992, Version 1.02, pp. 1-9.

Dr. G. Fairhurst, *MPEG-2 Transmission*, www.erg.abdn.ac.uk/public_html/research/future-net/digital-video/mpeg2-trans.html (Site updated Jan. 2001), 10 pages.

ISO/IEC JTC1/SC29/WG11, MPEG-2 Generic coding of moving pictures and associated audio information, Oct. 2000, 9 pages.

*Compressed Video Storage and Manipulation*, 1473, The High-Definition Television Grand Alliance System.

Wu J-L et al: "An Efficient JPEG to MPEG-1 Transcoding Algorithm" IEEE Transactions On Consumer Electronics, IEEE Inc. New York, US, vol. 42, No. 3, Aug. 1, 1996, pp. 447-457.

Kim D et al. : "Transcoding DV Into MPEG-2 in the DCT Domain" Proceedings Of The Spie, Spie, Bellingham, VA, US vol. 3653, No. ½, 1998, pp. 1026-1032.

Gonzalez R C et al. : "Digital Image Processing", Digital Image Processing, Upper Saddle River, NJ, Prentice Hall, US, 2002, pp. 498-502, the whole document.

Smith B et al: "Algorithms for Manipulating Compressed Images" IEEE Computer Graphics and Applications, IEEE Inc. New York, US, vol. 13, No. 5 Sep. 1, 1993, pp. 34-42, the whole document.

\* cited by examiner

RECONSTRUCTING A COMPRESSED STILL IMAGE BY TRANSFORMATION TO A COMPRESSED MOVING PICTURE IMAGE

BACKGROUND OF THE INVENTION

This invention relates to reconstructing a compressed image and more particularly relates to transformation of such images.

The image data recorded by digital still cameras (DSC) are usually compressed by JPEG and stored in the exchangeable image file format (EXIF) specified by Japan Electronic Industry Development Association (JEIDA). One of the computational bottlenecks in decoding the EXIF file is performing Discrete Cosine Transform (DCT) operations in the JPEG decompression process, especially when the image size is large. Existing reconstruction techniques require the costly and time-consuming process of developing new reconstruction chips tailor-made for the EXIF format. As a result, there is a need for more economical and versatile reconstruction of still picture images, including still picture images stored in the EXIF format.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

An apparatus form of the invention can be used to reconstruct an image from still image compressed data. In such an environment, the apparatus comprises a transcoder arranged to transcode the still image compressed data into a bit stream of moving picture compressed data, and a decoder arranged to generate the reconstructed image by decoding the bit stream of moving picture compressed data.

A method form of the invention can be used to reconstruct an image from still image compressed data. In such an environment, the method comprises transcoding the still image compressed data into a bit stream of moving picture compressed data and generating the reconstructed image by decoding the bit stream of moving picture compressed data.

By using the foregoing techniques, compressed still images can be reconstructed with a degree of economy and convenience previously unattainable. These and other advantages and novel features of the present invention, as well as details of an illustrated embodiment thereof, will be more fully understood from the following description and drawings.

DETAILED DESCRIPTION OF THE INVENTION

Figure 1:
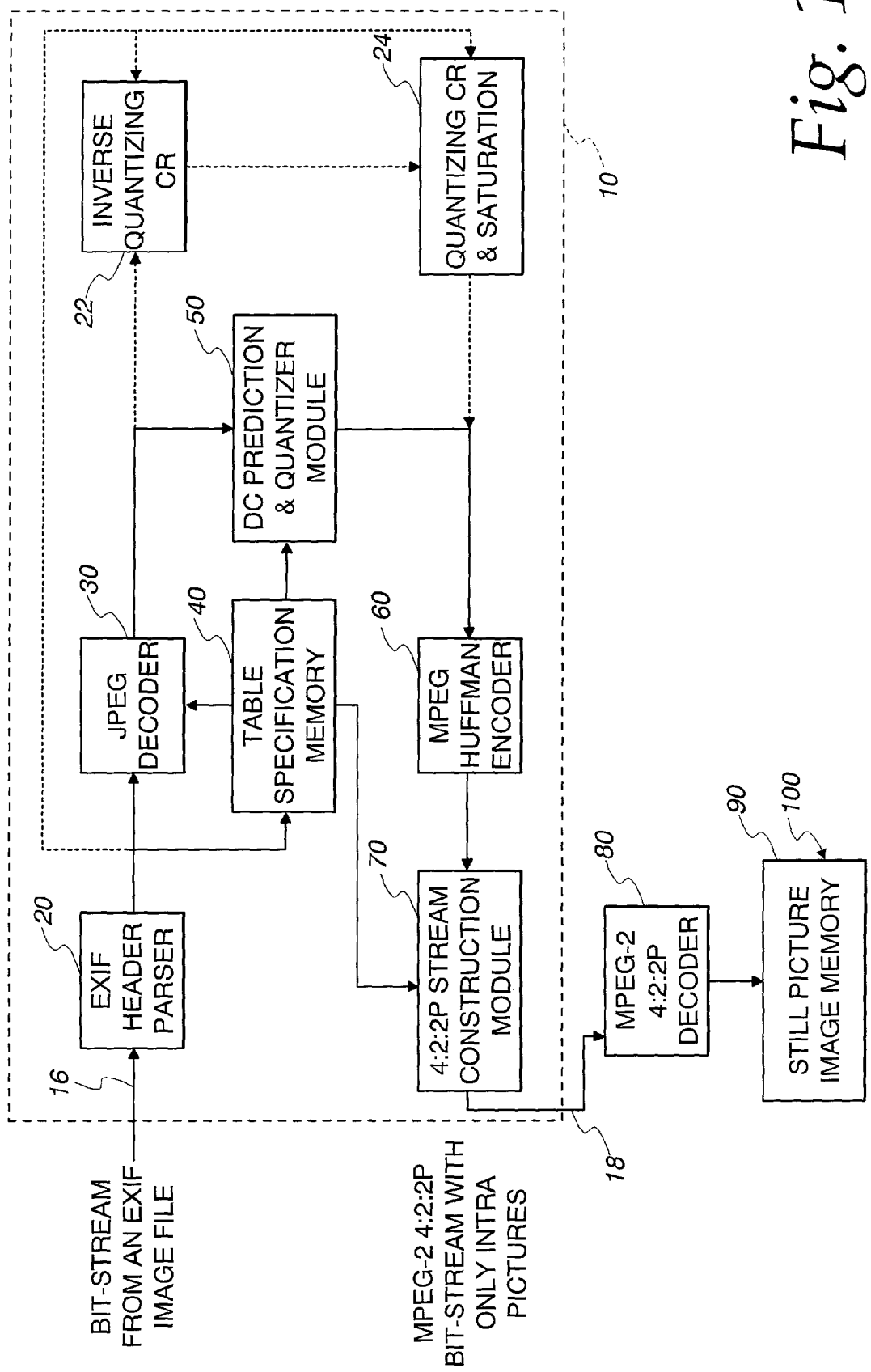
FIG. 1 is a schematic block diagram of one form of a transcoder and decoder for reconstructing an image from compressed still picture image data in accordance with the invention.

The applicants have discovered that compressed still picture images surprisingly can be reconstructed by first transcoding the still picture images into to compressed moving picture data and then decoding the compressed moving picture data to reconstruct the still image.

More specifically, the applicants have discovered that the ASIC chips of digital television (DTV) set-top boxes are designed for processing compressed moving pictures, and that these chips are very efficient in performing the type of DCT operations required to reconstruct still picture images, provided that the still picture data is transcoded into a format compatible with compressed moving picture data. Most such chips are unable to directly decode the still picture images. To enable these chips for processing the still picture image data, a conversion from compressed still picture data to a bit-stream of compressed moving picture data is required. For example, a compressed still picture image in the EXIF Image File format can be reconstructed by transcoding the JPEG images used in the EXIF to a bit-stream of MPEG-2 4:2:2 Profile with only intra pictures. The MPEG-2 4:2:2 bit stream may then be decoded with existing MPEG-2 decoding chips.

The EXIF is a standard file format for the image data recorded by digital still cameras (DSC). The EXIF standard is described in "Digital Still Camera Image File Format Standard", Japan Electronic Industry Development Association, Version 2.1 Jun. 12, 1998, which is incorporated by reference into this specification in its entirety. The aim of EXIF is to ensure data compatibility and exchangeability, providing a framework in which digital still camera products can be used readily by ordinary consumers.

The EXIF standard consists of the EXIF image file specification and the EXIF audio file specification. The EXIF image file is commonly used by most of the DSCs in the market. Image data in the EXIF employs the following existing image formats, depending on the image data type:

RGB uncompressed data: Baseline TIFF Rev. 6.0 RGB Full Color Images;

YCbCr uncompressed data: TIFF Rev. 6.0 Extensions YCbCr Images; and

JPEG compressed data: JPEG Baseline ADCT.

The applicants have discovered that JPEG compressed data is suitable for implementing at least one embodiment of the invention. Therefore, the remainder of the specification will focus on the structure of JPEG compressed data type. Some of the important facts in JPEG compressed images for EXIF are summarized as follows:

Image data is recorded as square pixels with a pix aspect ratio of 1:1.

Pixel sampling for image data is either Y:Cb:Cr=4:2:2 or Y:Cb:Cr=4:2:0 with 8-bit each. (JPEG also allows 12-bit pixel, but not in the EXIF.) As sampling points on the elements making up pixels, the Y and Cb, Cr sampling points may be either co-sited or centered. In the case of Y:Cb:Cr=4:2:2, spatial co-siting is recommended as the same as MPEG-2 video for the sake of improved image quality on TV systems. For Y:Cb:Cr=4:2:0, spatial centering is recommended as per the TIFF default and is the same as MPEG-1 video.

Quantization Tables: JPEG files used in the EXIF allow at most three quantization tables for Y, Cb and Cr, respectively. (In general, JPEG can allow at most four quantization tables, but not in the EXIF.) Each table has a precision of 8 bits. (JPEG can have a precision either 8 or 16 bits for the table, but not in the EXIF.)

Since JPEG compresses images in blocks of 8×8 pixels, preferably the pixel number set as the width and height of the image should be exact multiples of the 8×8 pixels (e.g., multiples of 16 for width, and multiples of 8 for height if Y:Cb:Cr=4:2:2, or 16 if Y:Cb:Cr=4:2:0).

The image data arrangement is Y1 Y2 Cb1 Cr1 Y3 Y4 Cb2 Cr2 for Y:Cb:Cr=4:2:2 and is Y1 Y2 Y3 Y4 Cb Cr for Y:Cb:Cr=4:2:0.

The MPEG-2 4:2:2 profile is intended for professional video applications where editing of compressed video and multiple-generation encoding/decoding of video are important requirements. The primary applications targeted by this profile are: storage; editing and creation of visual effects; Video tape or disk recording for professional use (contribution quality); studio post-production of high-quality video sequences; and efficient transmission for storage and distribution of contribution quality video.

The 4:2:2 profile can provide higher video quality, better chroma resolution and can allow a higher bit-rate (at Main Level(ML), up to 50 Mbit/s) than Main Profile (e.g. MP@ML). In studio applications, very high quality video and ITU-R 601 4:2:2 video format are often needed to ease chroma keying and other special effects. Because of the requirement of ease of editing, more frequent INTRA pictures are necessary which also result in high coding bit-rates. The 4:2:2 profile permits all I-picture encoding. This enables fast recovery from transmission errors and can simplify editing application. This profile allows the high bit rates required to maintain high quality while using only I-picture coding. The 4:2:2 profile also allows the use of P- and B-picture coding types which can further improve quality or reduce bit rate for the same quality. The MPEG-2 standard most applicable to the embodiments described in this specification is described in ANSI/SMPTE 308M, SMPTE STANDARD for television—MPEG-2 4:2:2 Profile at High Level, 1997, which is incorporated by reference in its entirety into this specification.

In a typical TV broadcast chain, video goes through multiple generations of encode/decode as local TV stations add local programming information and commercials to video before it gets distributed to consumers for reception at home. With analog TV, multiple generations of encode/decode can result in significant picture quality losses. On the other hand, the MPEG-2 4:2:2 Profile can preserve high quality after multiple generations of encoding/decoding. In the case of multiple generations without picture manipulation or change in picture coding type between generations, the quality from the 4:2:2 profile coder remains nearly constant after the first generation. Use of picture manipulation or change in picture coding type between generations causes some degradation in quality. Nevertheless, the resulting quality is acceptable for a broad range of applications.

A TV studio typically produces contribution quality video which usually is ITU-R 601 source video or is 4:2:2P@ML (4:2:2P@HL) compressed video. This video is then encoded and transmitted as distribution quality TV. Digital television and high-definition television (HDTV) in North America have adopted MPEG-2 MP@ML and MP@HL as their video coding standard. Both MP@ML and MP@HL encode and transmit only 4:2:0 format distribution quality video. For example, the aggregate data rate for a HDTV system, which includes compressed video, compressed audio, conditional access, and an auxiliary data channel, is around 18 to 20 Mbits/s.

Two embodiments of the invention involve method and apparatus for converting a EXIF Image File with compressed JPEG images to a bit-stream of MPEG-2 4:2:2 Profile with intra pictures. This conversion process is often referred as "transcoding", and is performed by a "transcoder." Such a transcoder is an instrument that converts a compressed JPEG bit stream into a MPEG-2 4:2:2P bit stream with an equal quality. A transcoder that converts a compressed JPEG bit stream into a MPEG-2 4:2:2P bit stream can simply be a concatenation of a partial JPEG decoder and a partial MPEG 4:2:2P encoder without performing the Discrete Cosine Transform (DCT). FIG. 1 shows a block diagram of such a transcoder 10.

In general, when a bit-stream from an EXIF image file with JPEG-compressed images is input on a path 16 to an EXIF header parser 20, the transcoder partially decodes the JPEG bit-stream and re-assembles the results to a 4:2:2P bit-stream on a path 18.

The dashed lines in FIG. 1 mean that transcoder 10 needs to requantize the Cr component if the different quantization matrices are used for Cb and Cr. In most applications, Cb and Cr share the same quantization matrix. Thus, the dashed line portions can be ignored in such applications. The dashed line portions include an inverse quantizing Cr module 22 and a quantizing Cr and saturation module 24.

Still referring to FIG. 1, transcoder 10 also comprises a JPEG decoder 30 that receives input from Table Specifications stored in a memory 40. Output from decoder 30 is transmitted to a DC prediction and quantizer module 50. The output of module 50 is sent to an MPEG Huffman encoder 60 that generates variable length Huffman code. The variable length code from encoder 60 is sent to a 4:2:2P stream construction module 70 that multiplexes the Huffman code with MPEG-2 table values received from memory 40. The MPEG-2 table values are transcoded from JPEG table values in a manner described later. The operation of module 70 results in an MPEG-2 4:2:2P bit stream with only intra pictures that is sent over path 18 to a conventional MPEG-2 4:2:2P decoder 80 of the type found in chips manufactured by Broadcom Corporation under model number BCM7020. Decoder 80 performs an inverse discrete cosine transform in order to generate a still picture image 90 that can be stored in a digital memory 100.

Figure 4:
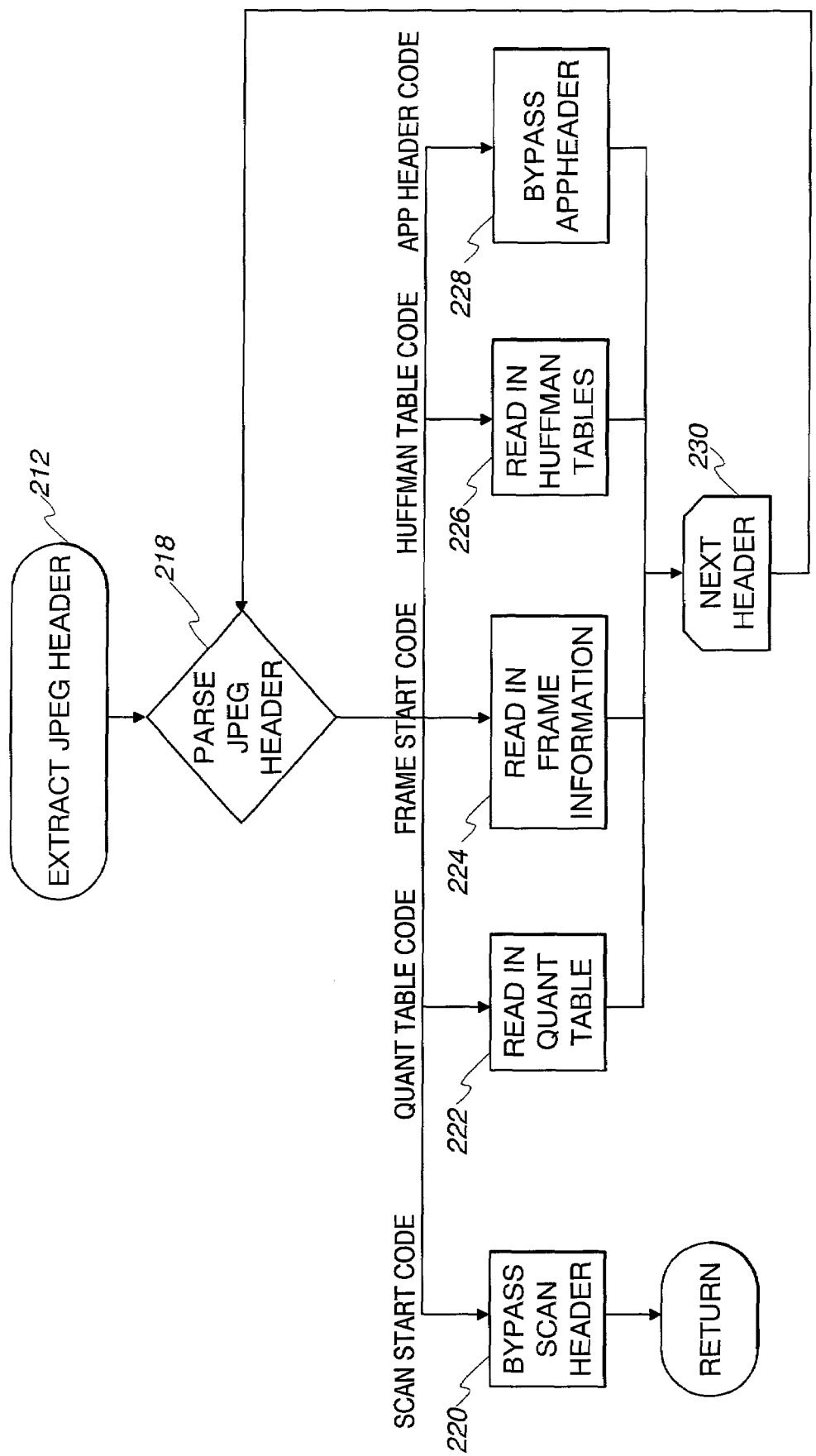
FIG. 4 is a flow diagram showing the extract JPEG header portion of the transcode stream shown in FIG. 3.
Figure 6:
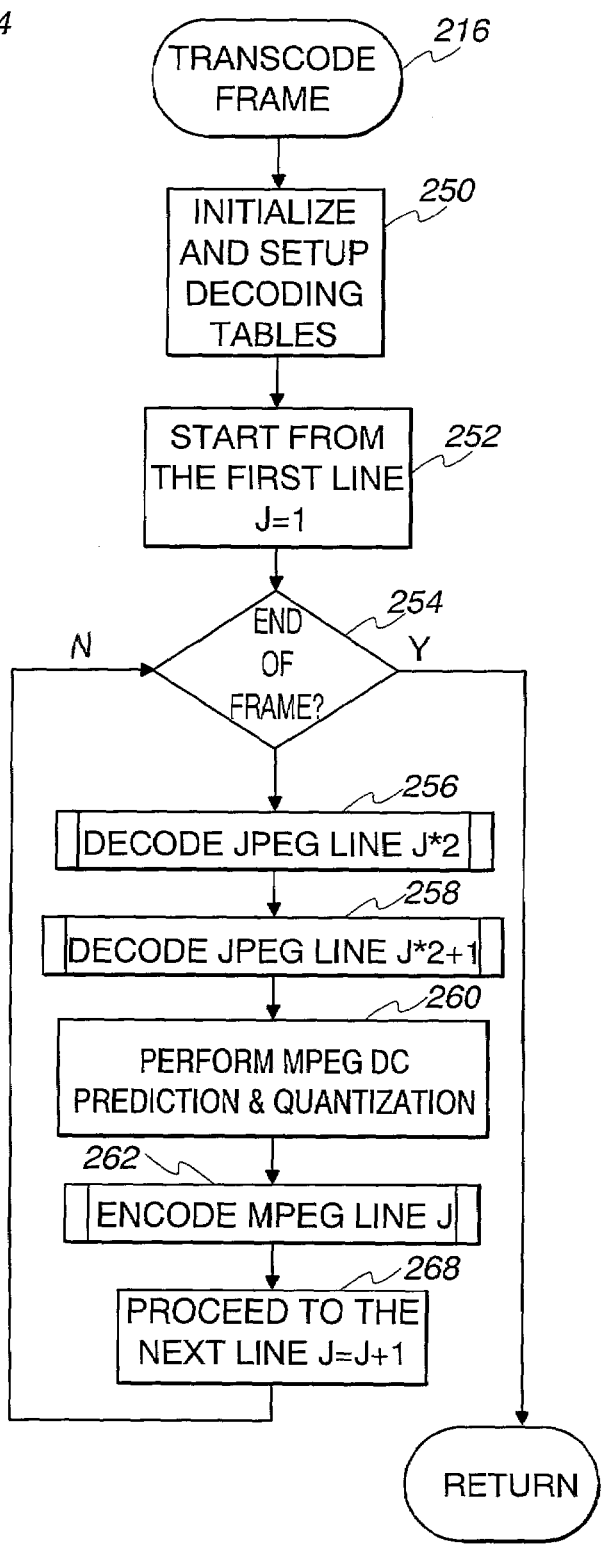
FIG. 6 is a flow diagram showing the transcode frame portion of the transcode stream shown in FIG. 3.
Figure 7:
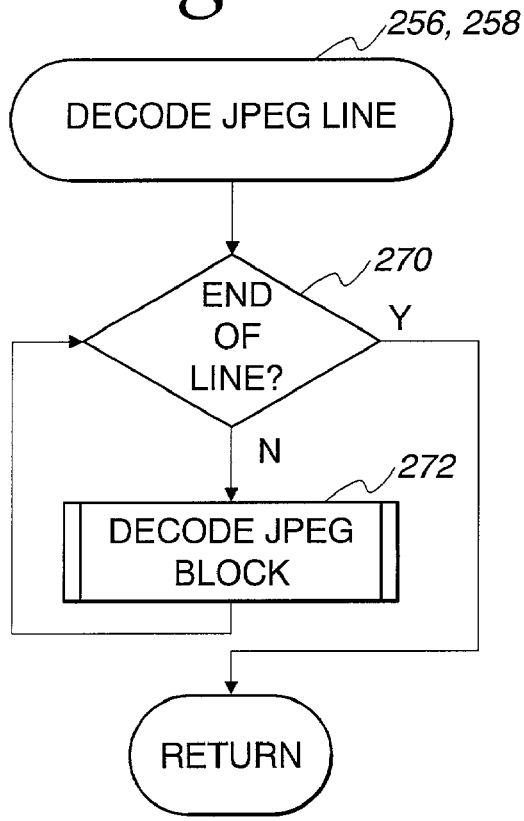
FIG. 7 is a flow diagram showing the Decode JPEG Line J*2 and Decode JPEG Line J*2+1 portions of the transcode frame shown in FIG. 6.
Figure 9:
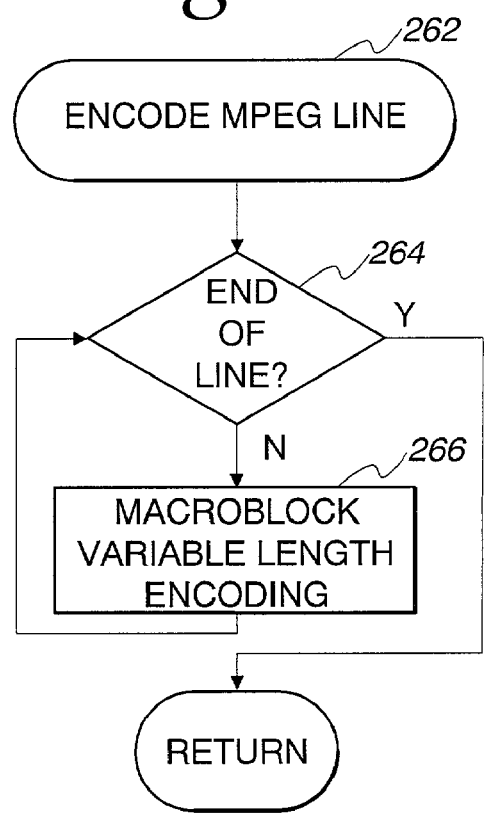
FIG. 9 is a flow diagram showing the Encode MPEG Line portion of the transcode frame shown in FIG. 6.
Figure 8:
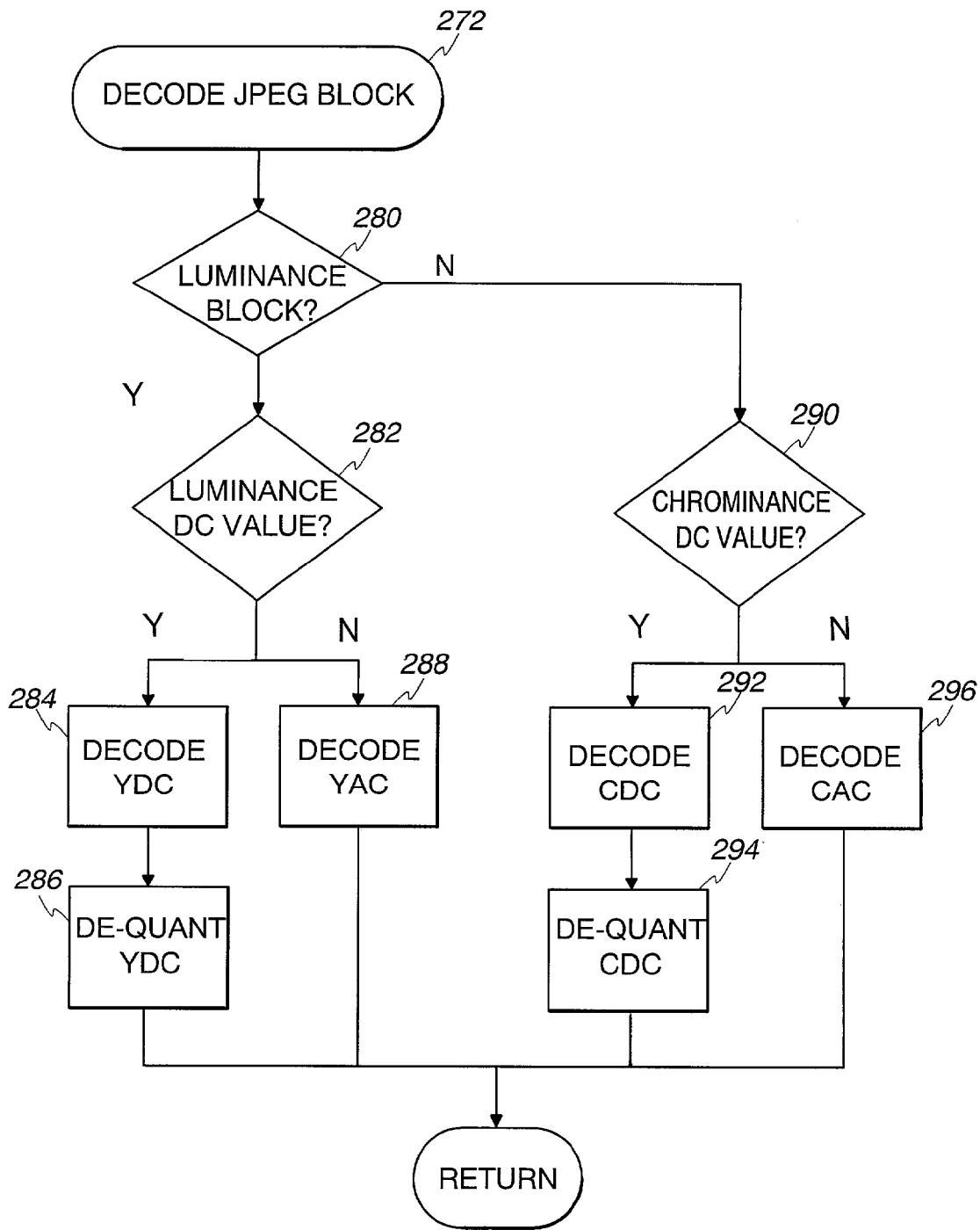
FIG. 8 is a flow diagram showing the Decode JPEG Block portion of the Decode JPEG Line shown in FIG. 7.

Still referring to FIG. 1, parser 20 performs the operations illustrated in FIG. 4; decoder 30 performs the decoding operations shown in FIGS. 6, 7 and 9; quantizer module 50 performs step 260 shown in FIG. 6; and encoder 60 performs the operations shown in the macroblock variable length encoding portion of FIG. 8.

The syntax mapping of an EXIF of JPEG-compressed image to 4:2:2P bit-stream can be summarized in the following table:

TABLE 1

| JPEG | MPEG-2 4:2:2P |
|---|---|
| Quantization table Y (DQT: Define Quantization Table) | Intra_quantiser_matrix (Quant matrix extension) |
| Quantization table Cb (DQT: Define Quantization Table) | Chroma_intra_quantiser_matrix (Quant matrix extension) |

TABLE 1-continued

| JPEG | MPEG-2 4:2:2P |
|---|---|
| Quantization table Cr (DQT: Define Quantization Table) | Not Applicable |
| Vertical lines (SOF: Start of Frame) | Vertical_size_value (Sequence header) Vertical_size_extension (Sequence extension) |
| Horizontal lines (SOF: Start of Frame) | Horizontal_size_value (Sequence header) Horizontal_size_extension (Sequence extension) |
| H0, V0 (SOF: Start of Frame) | Chroma_format (Sequence extension) Chroma_format = "10" if H0 = 2 and V0 = 1; Chroma_format = "01" if H0 = 2 and V0 = 2; |
| Square pixels (Pixel Aspect) | Aspect_ratio_information = "0001" (default) (Sequence header) It can also be re-programmed (see the note below). |
| Not Applicable | sequence header: Bit rate (Bit_rate_value in sequence header) is set to 50 Mbits/s if Horizontal lines <=720 && Vertical lines <=576; Otherwise, it is set to 300 Mbits/s. VBV buffer size (vbv_buffer_size_value) is set to 9437184 bits (vbv_buffer_size_value =576) if Horizontal lines <=720 && Vertical lines <=576; Otherwise, it is set to 47,185,920 bits (vbv_buffer_size_value=2880). Frame_rate_code = "0100" or "0101" (No specific requirement on this parameter. It can be re-programmed). |
| Not Applicable | sequence extension: Profile_and_level_indication is set to "1 0000101" if Horizontal lines <=720 && Vertical lines <=576; Otherwise, it is set to "1 0000010". Progressive_sequence = 1 Low_delay =1 |
| Not Applicable | picture header: Picture_coding_type = "001" (Intra picture) Vbv_delay = 0xFFFF (VBR) |
| Not Applicable | picture coding extension: f_code [i] [j] = 0xF intra_dc_precision = "00" (defaulted to 8 bits, but it can be programmed up to 11 bits) picture_structure = "11" (frame picture) top_filed_first = 0 frame_pred_frame_dct = 1 concealment_motion_vectors = 0 q_scale_type = 0 intra_vlc_format = 0 alternate_scan = 0 repeat_first_field = 0 chroma_420_type = 1 (the same as progressive frame) progressive_frame = 1 composite_display_flag = 0 |

In general, parser 20 parses the JPEG data in an EXIF frame header as shown in the left column of Table 1 and places the parsed data in memory 40. Parser 20 also maps or transforms the data into corresponding MPEG-2 data as shown in the right column of Table 1. Construction module 70 multiplexes the data in the right column of Table 1 with the output from encoder 60 to form an MPEG-2 4:2:2P bit stream with only intro pictures on path 18.

Regarding the Table 1 embodiment, JPEG luminance data includes JPEG table Y data, and MPEG luminance data includes MPEG intra_quantiser_matrix data. JPEG chrominance data includes JPEG quantization tables Cb and Cr. and MPEG chrominance data includes MPEG chroma_intra_quantiser_matrix data. JPEG block data includes the 8 by 8 pixels of a JPEG block, and MPEG block data includes the 16 by 16 pixels of an MPEG-2 macroblock. JPEG variable length coding data includes the JPEG Huffman tables, and MPEG variable length coding data includes the MPEG variable length code tables. JPEG vertical line data includes the JPEG vertical lines, and MPEG vertical line data includes the MPEG vertical_size_value and vertical_size extension. JPEG horizontal line data includes the JPEG horizontal lines, and MPEG horizontal line data includes the MPEG horizontal_size_value and horizontal_size_extension. JPEG DC coefficient data includes the JPEG Huffman Table, and MPEG DC coefficient data includes the MPEG DC coefficients of intra coded blocks. A JPEG line includes a number of JPEG blocks with the same vertical position. An MPEG line includes a number of MPEG macroblocks with the same vertical position. A pair of JPEG lines can be converted into a single MPEG line.

Figure 2:
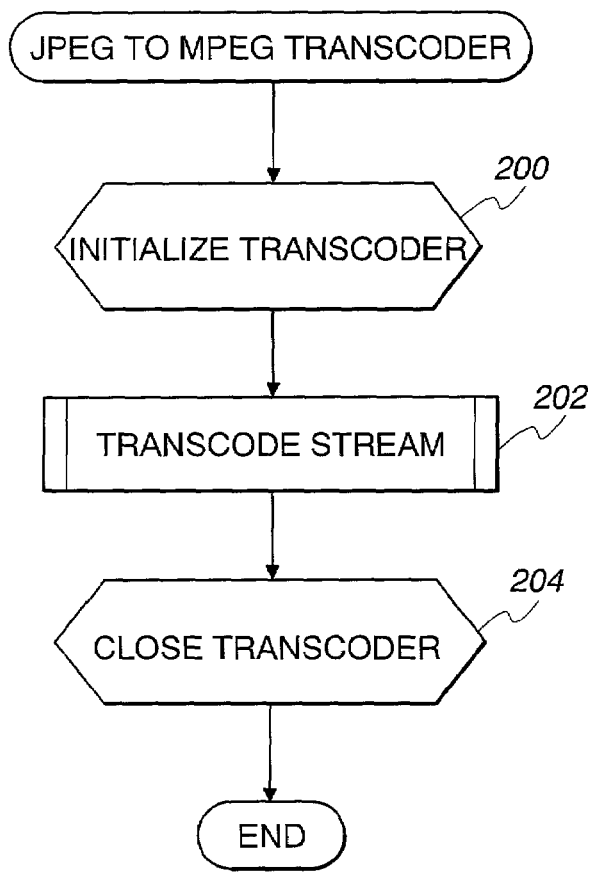
FIG. 2 is a flow diagram illustrating the method performed by the transcoder shown in FIG. 1.

Referring to FIG. 2, transcoder 10 begins a cycle of operation by performing an initialization step 200. In a step 202, the bit stream from an EXIF image file input on path 16 is transcoded to an MPEG-2 4:2:2P bit stream with only intra pictures on path 18. In a step 204, the cycle of operation is closed.

Figure 3:
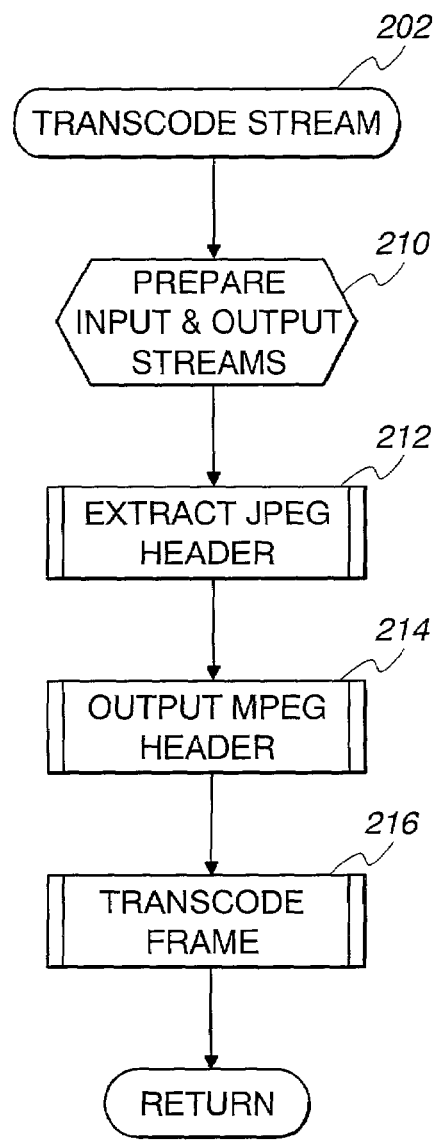
FIG. 3 is a flow diagram showing steps of the transcode stream portion of the flow diagram shown in FIG. 2.

FIG. 3 illustrates step 202 of FIG. 2 in more detail. In a step 210, the input and output streams on paths 16 and 18 are prepared. In a step 212, parser 20 extracts the frame header of the EXIF image file. In a step 214, construction module 70 outputs an MPEG header. In a step 216, decoder 30, quantizer module 50 and encoder 60 transcode a JPEG frame to an MPEG frame.

FIG. 4 illustrates step 212 of FIG. 3. In a step 218, parser 20 parses a JPEG header from the EXIF image file input on path 16. In a step 220, parser 20 bypasses the JPEG scan header of the EXIF image file input on path 16. In a step 222, parser 20 reads the EXIF quant table into memory 40. In a step 224, parser 20 reads EXIF frame information into memory 40. In a step 226, parser 20 reads the EXIF Huffman tables into memory 40. In a step 228, parser 20 bypasses the APP 1 and APP 2 markers in the EXIF frame. In a step 230, parser 20 begins to operate on the next JPEG frame header in the bit stream on path 16. When the JPEG header has been parsed, the steps shown in FIG. 4 return to step 214 of FIG. 3.

Figure 5:
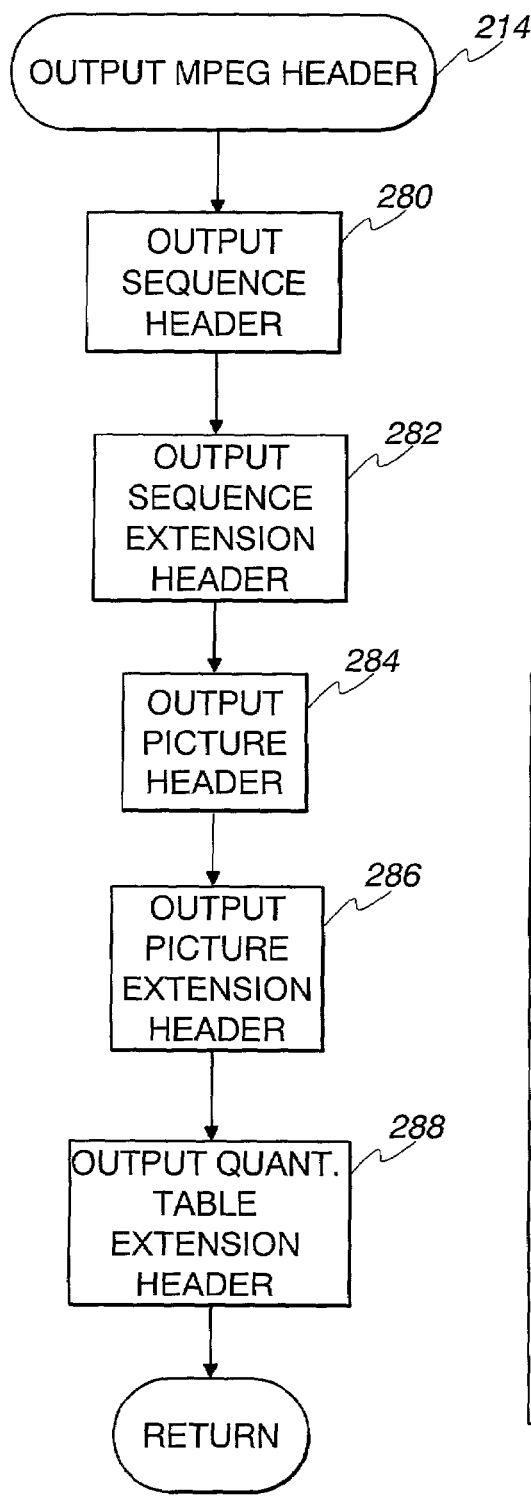
FIG. 5 is a flow diagram showing the output MPEG header portion of the transcode stream shown in FIG. 3.

FIG. 5 shows step 214 of FIG. 3 in more detail. In a step 280, module 70 outputs an MPEG-2 sequence header. In a step 282, module 70 outputs an MPEG-2 sequence extension header. In a step 284, module 70 outputs an MPEG-2 output picture header. In a step 286, module 70 outputs an MPEG-2 picture extension header. The operations then return to step 216 of FIG. 3.

FIG. 6 illustrates transcode frame step 216 of FIG. 3. In a step 250, decoder 30 initializes and sets up decoding tables to decode the JPEG data in memory 40. In a step 252, decoder 30 starts with a first JPEG line of data J=1. In a step 254, decoder 30 determines whether the line being processed is the last line in the JPEG frame. This information is available from the vertical lines data shown in Table 1. If the answer to block 254 is negative, in a step 256, decoder 30 decodes JPEG line J*2. In this context, J*2 means the even line.

In a step 258, decoder 30 decodes the next line after line J*2, which is identified as line J*2+1. Step

258 is necessary because two JPEG lines are combined to form an MPEG macroblock of data.

FIG. 7 illustrates the operations performed for both steps 256 and 258 shown in FIG. 6. In a step 270, decoder 30 determines whether the JPEG block being processed is the end block in the line of JPEG data. If not, in a step 272, decoder 30 decodes an 8 by 8 pixel JPEG block of the line being processed. The sequential blocks in the JPEG line are decoded until the end of the line is reached, at which point, the operations return to FIG. 6.

FIG. 8 illustrates in more detail step 272 of FIG. 7. In a step 280, decoder 30 determines whether the block being decoded is a luminance block. If so, in a step 282, decoder 30 determines whether the luminance block has a DC value. If so, in a step 284, the Ydc value from the JPEG Huffman table is decoded, and in a step 286, decoder 30 dequantizes the decoded Ydc value. In a step 288, decoder 30 decodes the Yac value from the JPEG Huffman table.

Returning to step 280, if the block being processed is not a luminance block, then, in a step 290, decoder 30 determines whether the block has a chrominance DC value. If so, in a step 292, decoder 30 decodes a Cdc value from the JPEG Huffman table, and in a step 294, dequantizes the decoded Cdc value. In a step 296, decoder 30 decodes a Cac value from the JPEG Huffman table. The decoder 30 then returns to the operation shown in FIG. 6.

Returning to FIG. 6, in a step 260, quantizer module 50 performs MPEG-2 DC prediction according to section 7.4.1 of the MPEG-2 specification based on the decoded and dequantized Ydc values, decoded Yac values, decoded and dequantized Cdc values and decoded Cac values obtained in the steps shown in FIG. 8. Module 50 also quantizes the MPEG values derived from the steps shown in FIG. 8.

In addition to the operations shown in FIG. 6, decoder 30 also maps the decoded JPEG data into MPEG-2 syntax elements as shown in Table 1.

Still referring to FIG. 6, in a step 262, encoder 60 encodes an MPEG line. Step 262 is shown in more detail in FIG. 9. In a step 264, encoder 60 determines whether the end of the current MPEG line has been reached. If not, in a step 266, MPEG-2 macroblock variable length encoding is performed on the 16 by 16 MPEG-2 macroblock being processed. At the end of the current MPEG-2 line, the operations return to FIG. 6.

Referring again to FIG. 6, in a step 268, the operations return to step 254 that is performed by decoder 30.

The operations illustrated in FIGS. 2-9 can be performed by dedicated hardware of the type shown in FIG. 1, or, alternatively, can be performed by a digital signal processor, or other type of computer processor.

The MPEG-2 4:2:2P bit stream with only intra pictures generated on path 18 is decoded by decoder 80 to generate a still picture image resulting from the EXIF image file that may be stored in a digital memory 100. Decoder 80 performs an inverse discrete cosine transform in order to generate the picture image. Decoder 80 performs a discrete cosine transform in order to generate the picture image.

The operations described in connection with the flow diagrams may be altered as follows:

For the case of Vertical_size=(Vertical lines/16)*16 and Horizontal_size=(Horizontal lines/16)*16, if either "Vertical lines" or "Horizontal lines" has a value more than 14 bits, the size and extension values in the corresponding MPEG side will be coded as the maximum allowed value.

Aspect_ratio_information can be reprogrammed on a basis of display aspect ratio (DAR), e.g. Aspect_ratio_information="0010" if DAR=3:4, Aspect_ratio_information="0011" if DAR=9:16.

If Horizontal lines <=720 and Vertical lines <=576, the output stream is coded as a 4:2:2 Profile at the MPEG Main Level; Otherwise, the output stream is coded as a 4:2:2 Profile at the MPEG High Level.

Additional details about the operations of transcoder 10 include the following:

The transcoder parser 20 parses the EXIF file and extracts coding parameters (including Huffman table and quantization matrices, etc.) and maps them to MPEG-2 syntax elements as described in Table 1.

The decoder 30 performs the JPEG decoding by its using the extracted Huffman tables.

The module 50 performs the inverse (JPEG) quantization and (MPEG) re-quantization to DC of each 8×8 JPEG block and performs the re-quantization of DC coefficients by QDC(8 bits)=DC//8 for intra_dc_precision=8, QDC(9 bits)=DC//4 for intra_dc_precision=9, QDC(10 bits)=DC//2 intra_dc_precision=10, QDC(10 bits)=DC//1 intra_dc_precision=11.

If the Cb and Cr use different quantization matrices, inverse quantization and re-quantization performed by modules 22 and 24 (FIG. 1) are required. To simplify the converting process, the quantization matrix for Cb is used for re-quantization in this case. The inverse quantization includes the saturation process with the range [−2048,+2047] for each coefficient from the inverse quantization arithmetic. When JPEG quantization tables for Cb and Cr are the same, as is true for most cases, operations of inverse quantization and re-quantization on non-CD CDT coefficients are not needed. This represents a significant saving of computation.

MEG DC Predictor in module 50 is reset in the beginning of each slice (every two rows of 8×8 blocks) Module 50 buffers two rows of 8×8 blocks and rearranges the data blocks as Y1 Y2 Y3 Y4 Cb1 Cr1 Cb2 Cr2. Module 50 then performs the DC prediction.

Encoder 60 performs the MPEG Huffman encoding.

Module 70 re-assembles the coded results to an MPEG-2 4:2:2P bit-stream.

The above techniques provide an elegant transcoder with good trade-off between cost and performance. To achieve complete lossless transcoding, one has to perform inverse quantization of all coded DCT coefficients and mismatch-control of each 8×8 block and then re-quantization of these coefficients.

To provide better visual experience, the sequence display extension can be inserted to specify the color primaries, color space transfer characteristics and matrix coefficients. It can also specify the display size. The picture display extension can also be used to specify the location of the picture on the screen.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

What is claimed is:

1. Apparatus for reconstructing an image from still image compressed data, comprising:
a transcoder arranged to transcode the still image compressed data into a bit stream of moving picture compressed data, the bit stream of moving picture compressed data comprising MPEG data and comprising I pictures, the bit stream of moving picture compressed data not comprising P pictures and B pictures, the transcoder comprising a Huffman encoder, a prediction and quantizer module, a still image compressed data decoder and a stream construction module, the stream construction module being downstream of the Huffman encoder and multiplexing Huffman code with MPEG table values, the Huffman encoder being downstream of the prediction and quantizer module, the prediction and quantizer module being downstream of the still image compressed data decoder, the transcoder transcoding without performing a discrete cosine transform; and
a second decoder arranged to generate the reconstructed image by decoding the bit stream of moving picture compressed data,
wherein the still image compressed data comprises discrete cosine transformed data and wherein the second decoder is arranged to perform an inverse discrete cosine transform, and
wherein the still image compressed data comprises EXIF data and wherein the bit stream of moving picture compressed data does not include MPEG-1 data.

2. The apparatus of claim 1 wherein the EXIF data comprises JPEG data.

3. The apparatus of claim 2 wherein the MPEG-2 data comprises a luminance component, a first chrominance component and a second chrominance component.

4. The apparatus of claim 3 wherein the luminance component is represented by 4 bits, the first chrominance component is represented by two bits and the second chrominance component is represented by two bits.

5. The apparatus of claim 2 wherein the EXIF data comprises a header and wherein the transcoder comprises:
a parser of the header arranged to generate parsed header data;
a JPEG decoder arranged to generate decoded data in response to the parsed header data and to map the decoded data into MPEG-2 syntax elements;
a DC predictor and quantizer arranged to generate MPEG-2 quantization data in response to the MPEG-2 syntax elements;
a Huffman encoder arranged to generate encoded data in response to the quantization data; and
a stream construction device responsive to the encoded data and the MPEG-2 syntax elements to generate MPEG-2 compressed data.

6. The apparatus of claim 5 wherein the JPEG decoder is responsive to a specification table.

7. The apparatus of claim 6 wherein the specification table comprises luminance quantization data, chrominance quantization data and Huffman code data.

8. The apparatus according to claim 1,
wherein the transcoder comprises a table specification memory,
wherein the table specification memory is operatively coupled to each of the following:
the Huffman encoder, the prediction and quantizer module, the still image compressed data decoder and the stream construction module,
wherein the stream construction module does not provide an MPEG-1 bit stream, and
wherein the stream construction module provides a 4:2:2 bit stream.

9. A method of reconstructing an image from still image compressed data comprising:
transcoding the still image compressed data into a bit stream of moving picture compressed data, the bit stream of moving picture compressed data comprising MPEG data and comprising I pictures, the bit stream of moving picture compressed data not comprising P pictures and B pictures; and
generating the reconstructed image by decoding the bit stream of moving picture compressed data,
wherein the still image compressed data comprising still image luminance data, chrominance data, block data, variable length coding data, vertical line data, horizontal line data and DC coefficient data,
wherein the transcoding comprises
parsing the still image compressed data;
extracting a Huffman table and a quantization matrix from the parsed still image compressed data;
mapping the extracted Huffman table and the extracted quantization matrix into syntax elements that are not MPEG-1 syntax elements;
converting the still image luminance data to moving picture compatible luminance data,
converting the still image chrominance data to moving picture compatible chrominance data,
converting the still image block data to moving picture compatible block data,
converting the still image variable length coding data to moving picture compatible variable length coding data,
converting the still image vertical line data to moving picture compatible vertical line data,
converting the still image horizontal line data to moving picture compatible horizontal line data, and
converting the still image DC coefficient data to moving picture compatible DC coefficient data,
wherein the decoding comprises decoding the moving picture compatible luminance data, chrominance data, block data, variable length coding data, vertical line data, horizontal line data and DC coefficient data to form an image,
wherein the still image compressed data further comprises discrete cosine transformed data and wherein the decoding comprises performing an inverse discrete cosine transform,
wherein the still image compressed data comprises EXIF data, and
wherein the moving picture compatible luminance data, chrominance data, block data, variable length coding data, vertical line data, horizontal line data and DC coefficient data does not comprise MPEG-1 data.

10. The method of claim 9 wherein the still image block data comprises 8 by 8 block data and wherein the moving picture compatible block data comprises 16 by 16 block data.

11. The method of claim 9 wherein the variable length coding data comprises Huffman coding data.

12. The method of claim 9 wherein the DC coefficient data comprises DC coefficients of intra coded block data.

13. The method of claim 9 wherein the EXIF data comprises JPEG data.

14. The method of claim 9 wherein the still image compressed chrominance data comprises a first chrominance component and a second chrominance component.

15. The method of claim 14 wherein the still image luminance data is represented by 4 bits, the first chrominance component is represented by two bits and the second chrominance component is represented by two bits.

16. An application specific integrated circuit (ASIC) that reconstructs an image from still image compressed data, comprising:
a transcoder arranged to transcode the still image compressed data into a bit stream of moving picture compressed data, the bit stream of moving picture compressed data not comprising MPEG-1 data, the bit stream of moving picture compressed data comprising I pictures, the bit stream of moving picture compressed data not comprising P pictures and B pictures; and
a decoder arranged to generate the reconstructed image by decoding the bit stream of moving picture compressed data,
wherein the still image compressed data comprises discrete cosine transformed data and wherein the decoder is arranged to perform an inverse discrete cosine transform,
wherein the still image compressed data comprises EXIF data,
wherein the transcoder comprises a variable length Huffman encoder, a DC prediction and quantizer module, a still image compressed data decoder and a stream construction module,
wherein the stream construction module is downstream of the Huffman encoder and multiplexes Huffman code with MPEG table values,
wherein the Huffman encoder is downstream of the DC prediction and quantizer module, and
wherein the DC prediction and quantizer module is downstream of the still image compressed data decoder.

17. The ASIC according to claim 16, wherein the transcoder is arranged to transcode without performing a discrete cosine transform.

18. The ASIC according to claim 16, wherein the transcoder requantizes a Cr component if different quantization matrices are used for Cb and Cr.

19. The ASIC according to claim 16, wherein the ASIC is used in a digital set-top box that processes compressed moving pictures.

20. The ASIC according to claim 16, wherein the transcoder only requantizes a Cr component if different quantization matrices are used for Cb and Cr.

* * * * *